United States Patent [19]

Steely, Jr. et al.

[11] Patent Number: 5,197,132
[45] Date of Patent: Mar. 23, 1993

[54] REGISTER MAPPING SYSTEM HAVING A LOG CONTAINING SEQUENTIAL LISTING OF REGISTERS THAT WERE CHANGED IN PRECEDING CYCLES FOR PRECISE POST-BRANCH RECOVERY

[75] Inventors: Simon C. Steely, Jr., Hudson, N.H.; David J. Sager, Acton, Mass.

[73] Assignee: Digital Equipment Corporation, Maynard, Mass.

[21] Appl. No.: 546,411

[22] Filed: Jun. 29, 1990

[51] Int. Cl.$^5$ .......................... G06F 9/00; G06F 11/30
[52] U.S. Cl. .................... 395/375; 364/231.8; 364/261.3; 364/DIG. 1; 395/425
[58] Field of Search ................ 395/800, 425, 200, 375

[56] References Cited

U.S. PATENT DOCUMENTS

| | | | |
|---|---|---|---|
| 4,574,349 | 3/1984 | Rechtschaffen | 395/425 |
| 4,587,612 | 5/1986 | Fisk et al. | 395/500 |
| 4,612,612 | 8/1983 | Woffinden et al. | 395/400 |
| 4,646,236 | 2/1987 | Crockett et al. | 395/650 |
| 4,725,947 | 8/1984 | Shonai et al. | 395/375 |
| 4,752,873 | 5/1986 | Shonai et al. | 395/800 |
| 4,769,770 | 9/1988 | Miyadera et al. | 395/400 |
| 4,777,594 | 2/1984 | Jones et al. | 395/375 |
| 4,794,518 | 12/1988 | Mizushima | 395/775 |
| 4,901,233 | 7/1987 | Liptay | 395/375 |

OTHER PUBLICATIONS

I.B.M. Technical Disclosure Bulletin Articles: vol. 24, No. 3, Aug. 1981, "General Purpose Register Extension" by S. M. Desai, pp. 1404-1405.

I.B.M. Technical Disclosure Bulletin Articles: vol. 29, No. 3, Aug. 1986, "Use of the Second Set of General . . . Resolution", by P. G. Emma et al., pp. 991-993.

*Primary Examiner*—Thomas C. Lee
*Assistant Examiner*—Meng-Ai T. An
*Attorney, Agent, or Firm*—Kenyon & Kenyon

[57] ABSTRACT

A register map having a free list of available physical locations in a register file, a log containing a sequential listing of logical registers changed during a predetermined number of cycles, a back-up map associating the logical registers with corresponding physical homes at a back-up point in a computer pipeline operation and a predicted map associating the logical registers with corresponding physical homes at a current point in the computer pipeline operation. A set of valid bits is associated with the maps to indicate whether a particular logical register is to be taken from the back-up map or the predicted map indication of a corresponding physical home. The valid bits can be "flash cleared" in a single cycle to back-up the computer pipeline to the back-up point during a trap event.

10 Claims, 2 Drawing Sheets

REGISTER MAPPING SYSTEM HAVING A LOG CONTAINING SEQUENTIAL LISTING OF REGISTERS THAT WERE CHANGED IN PRECEDING CYCLES FOR PRECISE POST-BRANCH RECOVERY

FIELD OF THE INVENTION

The present invention relates to registers in computers, and more specifically, to the mapping of registers in pipelined computers that have register files.

BACKGROUND OF THE INVENTION

Modern computers typically take advantage of the concept of pipelining when processing instructions. The instruction pipeline in a computer will have a plurality of stages, with each stage being able to operate on one instruction at the same time while a different stage is operating on another instruction. It is desirable to keep the pipeline full so that each stage in the pipeline is processing an instruction, in order to utilize the pipeline to its maximum effectiveness. To keep the pipeline full, the pipeline often must make certain predictions, such as which sequence of instructions to follow after a conditional branch instruction. If the prediction is correct, the execution of the instructions can follow without incident. However, if the wrong path of instructions is followed after the conditional branch instruction, then the pipeline must be backed up to the conditional branch instruction and the instructions of the correct path input to the pipeline for execution.

One of the problems that arises with the backing up of the pipeline is the fact that the values of the registers used in the execution of instructions will have changed between the time the conditional branch instruction was performed and when the error condition is recognized, as explained more fully below.

In modern computers, registers are used to store values. A typical instruction processed by the pipeline will add the values stored in two different registers and place the resulting value in a third register. For example, an instruction may be "add R7, R8→R9". This means that the contents of registers R7 and R8 should be added together and the result placed in register R9.

A problem results when a subsequent instruction calls for the use of a register that was changed since an earlier instruction passed through the pipeline. For example, assume that the instruction immediately following the instruction "add R7, R8→R9" is the instruction "add R1, R2→R7". In executing the second instruction, the contents of register R7 have been changed. If the first instruction, in which the contents of registers R7 and R8 are added, were to be performed over again after execution of the second instruction, due to a back up of the pipeline, the resulting value to be stored in R9 would be different.

In a pipelined computer, in which, for example, twenty instructions can be processed through the pipeline before a missed prediction or other trap condition is recognized, the value contained in any one of the registers may have been changed many times. There is therefore a need to save the results generated at certain pipeline stages until the complete pipeline has run its course, in case an event occurs that requires the pipeline to back up to a previous known state.

One approach for saving the results is register renaming. In register renaming, there are a number of registers, for example, thirty-two, which can be used by the instructions executed by the pipeline. These registers are hereinafter referred to as "logical registers". With register renaming, each logical register is mapped into a physical home located in a pool of registers that is larger than the number of logical registers. Each result generated for a logical register is given a new physical home in the pool of registers. Typically, the pool of registers is kept in a register file. Thus, multiple generations of the same logical register will be available and held in different physical homes in the register file.

In order to implement a register renaming scheme, a mechanism must be provided to determine what physical home holds the latest value for each logical register. This mechanism may be called a register map. In addition, it must be possible to restore the state of the register map to a state it was in at some time in the past, in order to be able to effectively back the pipeline up to that time in the past and process instructions again from that state.

SUMMARY OF THE INVENTION

The present invention provides a method and apparatus for register mapping which maps a plurality of locations of a register file in a register map. The register map of the present invention comprises a freelist that contains a number of locations beyond the number of logical registers, a backup map that contains a map to the physical homes for each of the registers at a backup point in time, and a predicted map that contains a map to the physical homes of the registers at the current point. Valid bits are associated with the predicted map, and indicate whether the physical home for a certain logical register is specified by the predicted map or the backup map. When it is desired to back up the pipeline to a backup point, the valid bits in the predicted map are all cleared in a single cycle in what is known as a "flash-clearing". Since the backup map contains a map of the physical homes at the backup point, the backup map will now contain an indication of the correct physical homes for each of the logical registers at the present point. The pipeline can then proceed, following the correct path of instructions beginning at the backup point using the correct values stored in the registers at the backup point.

DETAILED DESCRIPTION

Figure 1:
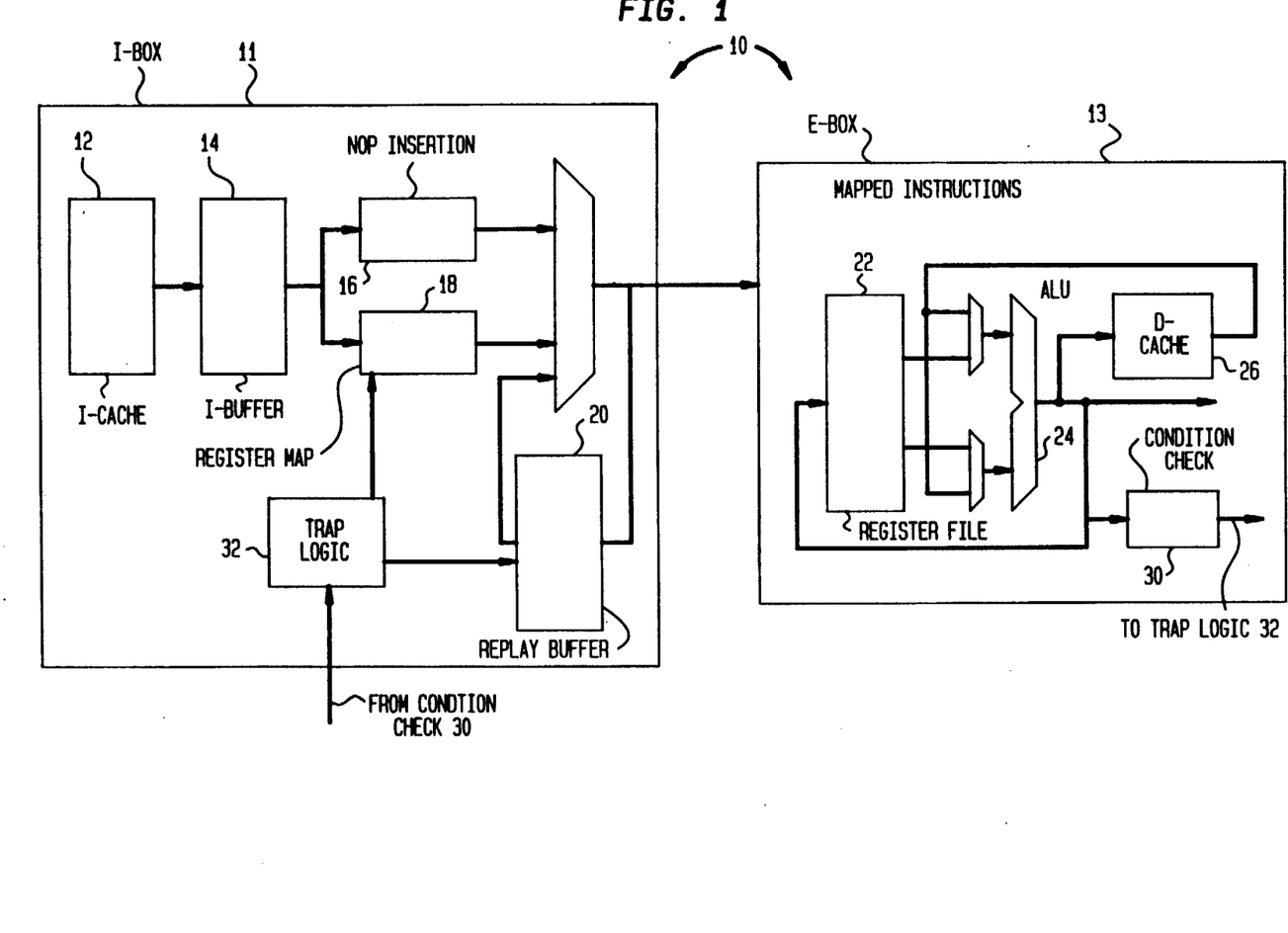
FIG. 1 shows a computer pipeline constructed in accordance with an embodiment of the present invention.

FIG. 1 illustrates a pipeline 10 for processing instructions in a computer. The pipeline 10 has an I-BOX 11 (instruction box) that provides mapped instructions to an E-BOX 13 (execution box).

The I-BOX 11 has an I-cache 12 which stores a number of instructions. The instructions are provided from the I-cache 12 to an I-Buffer 14 which buffers the instructions. Depending on the instruction buffered and sent from the I-Buffer 14, either a NOP (no operation) is inserted into the pipeline 10 by a NOP insertion stage 16, or a mapped instruction is produced by a register map 18, as will be described in more detail below.

The mapped instruction is sent to the E-BOX 13 to be executed. At the same time, the mapped instructions are temporarily stored in a replay buffer 20 for possible replaying in the event of a trap.

Once the E-BOX 13 receives a mapped or NOP instruction, the instruction is executed in a conventional manner using a register file 22, ALU 24 and a D-cache 26 (data cache) in which data is stored. A conditions stage 30 checks the condition of the executed instruction and will send a signal to trap logic 32, if necessary. This will be explained in more detail below.

A typical computer contemplated for use with the present invention has thirty-two registers that are used to store values during the execution of instructions. As an example, an instruction may be: "add R7, R8→R9". This means that the contents of registers R7 and R8 should be added together and the result placed in register R9, as described above.

In a pipelined computer, a problem can result when an instruction has to be repeated due to a trap, etc. For example, assume that the instruction immediately following the instruction "add R7, R8→R9" is the instruction "add R1, R2→R7". In executing the second instruction, the contents of register R7 have been changed. If the first instruction, in which the contents of registers R7 and R8 are added, were required to be performed over again, after execution of the second instruction, the resulting value would be different.

The above situation poses a problem in pipelined computers. In order to keep the pipeline 10 full so that each stage is processing instructions, the pipeline 10 makes certain predictions, such as which sequence of instructions to follow after a conditional branch instruction. If the prediction is wrong, the pipeline 10 must be backed up. Either a new sequence of instructions is followed (i.e. a different path), or the same instructions are followed with different data used.

The problem that arises in backing up the pipeline 10 is that many of the registers will no longer contain the correct values, as discussed above. For example, if twenty instructions have been processed through the pipeline 10 before the missed prediction (or other trap condition) is recognized, the value contained in one or more of the registers may have been changed many times. There is therefore a need to save the results generated at certain pipeline stages until the complete pipeline 10 has run its course in case an event (trap) occurs that requires the pipeline 10 to be backed up to a previous known state.

One way to do this is to provide many more locations to store the values than there are registers. If there are 32 registers that can be used, these can be considered as 32 "logical" registers. The actual value to be stored in one of these logical registers can be stored, however, in one of the many locations that are provided to store values. These locations are known as "physical homes". Thus, a single value will be considered to be stored in both a logical register and a physical home assigned to that logical register. Multiple physical homes can be assigned to one logical register in order to hold values produced and stored in the same logical register by different instructions. In the embodiment shown in FIG. 1, the physical homes are provided in the register file 22. Instead of containing merely 32 locations corresponding to 32 logical registers, the register file 22 of FIG. 1 has many more locations (e.g. 64) than the number of logical registers. These locations are the physical homes for the logical registers.

Although the use of physical homes and logical registers allows values of registers to be stored for a certain time, there needs to be a mechanism to keep track of which physical home was assigned to which logical register in every cycle during the backup time, i.e. the number of cycles from the cycle when an instruction is input to the pipeline to the cycle that a trap condition relating to that instruction is recognized by the pipeline, e.g. 20 cycles. Thus, if it is required to be able to back up N amount of cycles to what is known as the "backup point", then at least N amount of assignments (or "mappings") of physical homes must be able to be recalled. The backup point corresponds to the state of the pipeline when the instruction causing the trap condition was input to the pipeline.

The register map 18 of the present invention provides such a mechanism. An embodiment of the register map 18 is shown in more detail in FIG. 2. The register map 18 has a backup map 40, a predicted map 42, a valid bits register 43, a log 44 and a freelist 46. In an embodiment of the present invention, the backup map 40 is a $32 \times 6$ register file that is used to specify the physical home of each logical register at a backup position in the pipeline 10. The predicted map 42 is a $32 \times 6$ register file that provides the physical home of each logical register for the predicted-path. The valid bits register 43 is a $32 \times 1$ register associated with the predicted map 42 that can be "flash-cleared" when desired.

Figure 2:
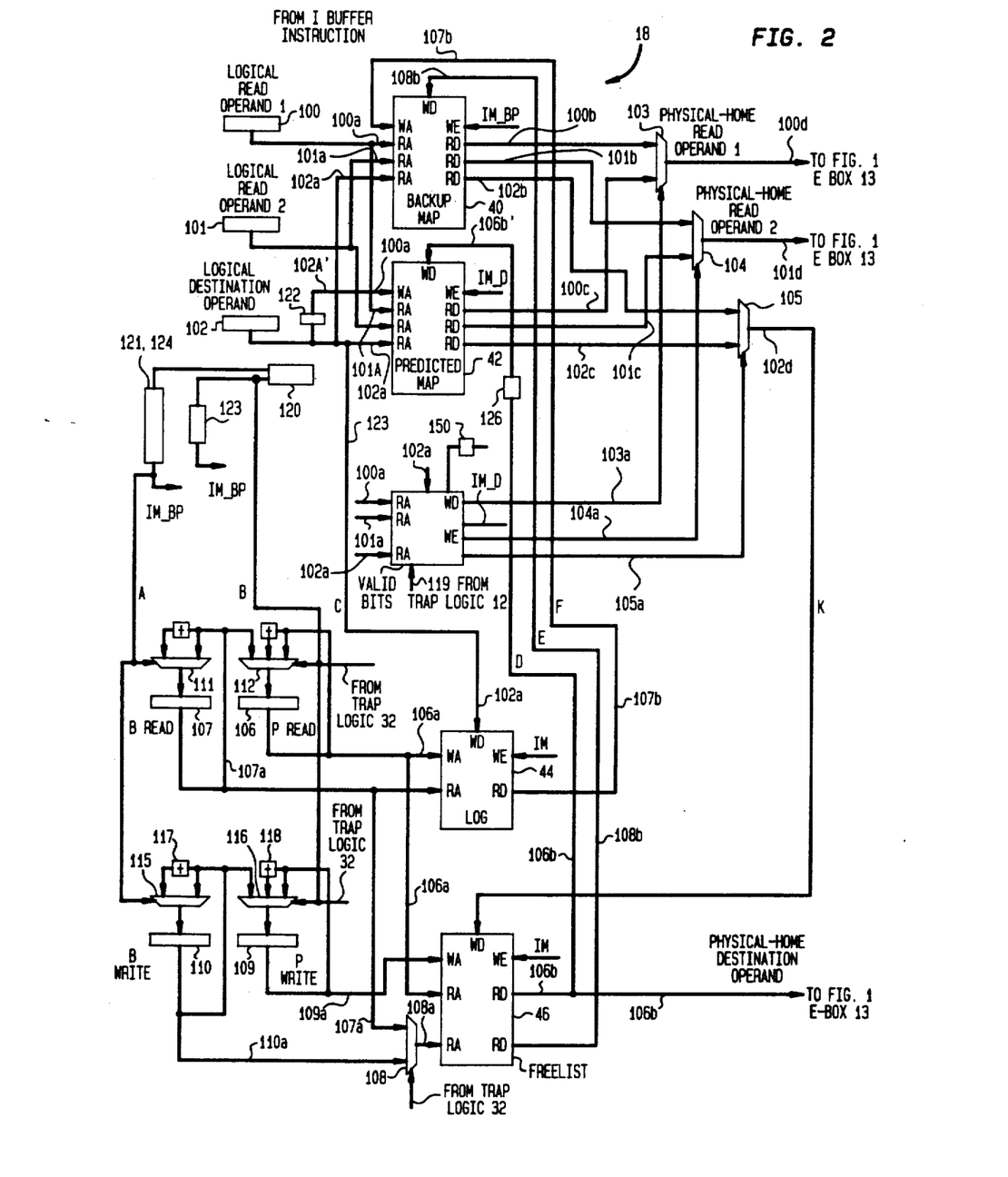
FIG. 2 shows a block diagram of an embodiment of a register map constructed in accordance with the present invention and used in the computer pipeline of FIG. 1.

In the general case, each of these structures would have a number of words equal to the number of logical registers. The backup and predicted maps would have a number of bits per word sufficient to address the full physical register file 22.

The log 44 is a $32 \times 5$ register file that contains a "log" or listing of the sequence of which logical registers were changed in the last 32 cycles so that the backup map 40 can be updated. The freelist 46 is a $64 \times 6$ register file that holds the list of locations or physical homes in the register file 22 that are available to be used as new physical homes. The size of the various elements in the register map 18 described above is an example, as other size register files can be used. In the general case, the number of words in the log 44 is equal to at least the number of cycles in the backup time which is, at most, the number of physical homes minus the number of logical registers. The bits per word in the log 44 is sufficient to hold a logical register number. The minimum number of words in the freelist 46 is the number of physical homes minus the number of logical registers plus at least a back up time number of entries. The number of bits per word is sufficient to hold a full physical home address.

As explained before, the register file 22 in the E-BOX 13 is such a size that it has many more locations or physical homes than there are logical registers addressed by the instructions being executed in the computer. In other words, if the computer operates with 32 logical registers, the register file 22 will have 32+N locations. In the illustrated embodiment of FIG. 1, the register file will have 64 locations so that N equals 32.

By having many more locations than logical registers, the pipeline 10 can perform register renaming. Thus, each of the registers addressed by the instructions being executed by the computer can be thought of as a logical register that is mapped into some physical home (i.e. location) in the register file 22. Each result that is generated for a logical register is given a new physical home in the register file 22. Therefore, multiple generations of the same logical register will be available and stored in different locations in the register file 22. As an example, the first time register R7 is loaded with a value, the physical home can be location 5 in register file 22. The second time that a value is loaded into the logical register R7, it can be loaded into a new physical home in the register file 22, such as location 59.

The register map 18 specifies the exact physical home of each logical register. The register map 18 keeps track of all of the changes that have occurred in the logical registers from the backup point along the predicted path, and also keeps track of where the physical home is for each of the logical registers of the present point and at the backup point itself.

Referring once again to FIG. 2, when an add instruction is to be executed, the number of the logical register, logical read operand 1 100, storing a first operand to be added to a second operand, pursuant to the add instruction, and the number of the logical register storing the second operand, logical read operand 2 101 are each input from the I buffer 14 as a read address (RA) 100a, 101a, respectively, to each of the backup map 40 and the predicted map 42. The number of the logical register into which the sum of the first and second operands is to be stored pursuant to the add instruction, logical destination operand 102 is also input as a read address (RA) 102a to each of the backup map 40 and predicted map 42 and is further input as write data (WD) 102a to the log 44.

Data stored at the location in the backup map 40 indexed by the logical read operand 1 read address 100a is output by the backup map 40 as read data (RD) 100b, which corresponds to the number of the physical home in register file 22 containing the first operand value at the backup point. Moreover, data stored at the location in the predicted map 42 indexed by the logical read operand 1 read address 100a is output by the predicted map 42 as read data (RD) 100c, which corresponds to the number of the physical home in register file 22 containing the first operand value at the present point in pipeline operation if the register has been written to since a previous backup.

Likewise, data stored at the location in the backup map 40 indexed by the logical read operand 2 read address 101a corresponds to the number of the physical home in register file 22 containing the second operand value at the backup point, which data is output by the backup map 40 as read data (RD) 101b and data stored at the location in the predicted map 42 indexed by the logical read operand 2 read address 101a corresponds to the number of the physical home in the register file 22 containing the second operand value at the present point, if that logical register has been written since a last backup, which data is also output by the predicted map, as read data (RD) 101c.

As illustrated in FIG. 2, physical home number read data (RD) 100b and 100c are each input to a respective input of a multiplexer 103. The output of multiplexer 103 comprises physical home read operand 1 100d and corresponds to the number of the physical home in register file 22 to be used as the mapped instruction register number for output of the first operand value by the register file 22 in connection with the execution of the add instruction in the ALU 24. Similarly, physical home read data (RD) 101b and 101c are each input to a respective input of a multiplexer 104. The output of multiplexer 104 comprises physical home read operand 2 101d and corresponds to the number of the physical home in register file 22 to be used as the mapped instruction register number for output of the second operand value by the register file 22 in the add operation of the ALU 24.

The logical destination operand read address (RD) 102a input to each of the backup map 40 and predicted map 42 indexes a respective location in each of the maps 40, 42 that contains data corresponding to the number of the physical homes for the destination logical register at each of the backup point and present point, respectively. This data is output as read data (RD) 102b and 102c, which are each input to a respective input of a multiplexer 105 having an output 102d for mapping of the destination physical home number, as will be described below.

The valid bits register 43 receives as inputs each of read addresses 100a, 101a and 102a to index a respective one bit field that indicates whether the predicted map 42 locations corresponding to the logical read operand 1 100, logical read operand 2 101 and logical destination operand 102, respectively, are valid. The valid bits register 43 has outputs 103a, 104a and 105a to output the valid bit of each location indexed by the read addresses 100a, 101a and 102a, respectively. As long as the pipeline 10 runs without a trap event requiring a backing up of the pipeline 10, valid bits in the valid bits register 43 can be set to indicate that the predicted map 42 contains valid physical home numbers.

The outputs 103a, 104a and 105a are each coupled to a select port of one of the multiplexers 103, 104, 105, respectively. When the valid bits are set, the outputs 103a, 104a, and 105a select the inputs 100c, 101c and 102c as the outputs 100d, 101d and 102d, corresponding to the physical home numbers indexed through the predicted map 42, as the outputs of the multiplexers 103, 104, 105, respectively. Thus, the physical home indicated by the predicted map 42 for each respective logical register is selected when the respective valid bit is set. When a valid bit is not set, the physical home for the respective logical register at the backup point, as indicated by the backup map 40, is selected as the output of the respective multiplexer 103, 104, 105. When a trap condition is recognized by the pipeline, the valid bits are all "flash cleared" in one cycle and the predicted map 40 becomes irrelevant. During each cycle following a trap condition, the valid bit for the logical register being written in each cycle is set valid to once again build the predicted map 42.

For the following example, the distance to the backup point is 20 cycles long. In other words, 20 cycles worth of instructions will have been processed by the pipeline 10 before it is known that the first instruction through the pipeline 10 was the cause of an event that requires the pipeline 10 to be backed up. Backup map 40 therefore contains the physical home of each of the 32 logical registers as they were at the backup point 20 cycles earlier. After 20 cycles of instructions have passed the register-mapping stage of the pipeline and no trap event has occurred, then, for each subsequent cycle, the backup map 40 is changed by the replacement of the old physical home with a new physical home from the log 44 for the logical register that was changed in the cycle that followed the cycle of the old backup point. Backup map 40 will then contain the physical home for each of the logical registers at this new backup point. As long as no trap event occurs, the backup point changes with each cycle, and therefore the backup map 40 is changed each cycle. The method of updating the backup map 40 will be described later.

The predicted map 42, which is also indexed by the logical register number, provides the "predicted-path" physical home for each logical register. In other words, the predicted map 42 contains the physical home for each logical register that has been written during the backup time at the current or present point and reflects the most recent point caused by the changes that have occurred to each register between the backup point and the current point, following along a predicted-path of execution. For example, if register R7 has been changed three times since the backup point to the current point, only the latest physical home will be found in the predicted map 42 at the location indexed by the local register number. Any logical register that is not written will not have its respective valid bit set, so that the backup map 40 continues to indicate both the current and backup physical home for the logical register.

In contrast to the function of the predicted map 42, which maintains a current listing of the physical home for each of the logical registers, the log 44 maintains a sequential list (or "log") of logical registers that have been written in each cycle. For example, if register R7 was changed in a first cycle, and R11 was changed in a second cycle, the first two entries in the log 44 will be R7 followed by R11.

It should be noted that the maximum amount of backup is a number of cycles equal to the number of physical homes minus the number of logical registers. Hence, the backup time or "backup distance" does not exceed this number. In our example, the backup distance is 20 cycles. However, 32 more physical homes than logical registers are provided. Accordingly, the backup distance in the exemplary embodiment could be expanded to 32 cycles if the pipeline took 32 cycles to recognize a trap condition.

There four pointers used to index each of the log 44 and the freelist 46. The pointers point to entries in the log 44 and freelist 46 that can be used to update the backup map 40 and the predicted map 42.

There are two pointers that are used as indices to the log 44. The first pointer is a pointer termed the P-read pointer 106. The second pointer is a B-read pointer 107. The two pointers point to changes that are a backup distance apart. For example, the B-read 107 (backup read pointer) will point to the location in the log 44 containing the number of the logical register that was changed at the backup point. The P-read pointer 106 (present read pointer) will point to the location in the log 44 containing the number of the logical register changed during the latest cycle (the present point). Since B-read 107 points to the location which contains the register that was changed a backup distance away from the present cycle (for example 20 cycles ago), then the locations contained between the P-read pointer 106 and the B-read pointer 107 will be a sequential listing of each of the logical registers that have been changed since the backup point. The two pointers P-read and B-read are moved with every cycle and maintain their separation (the backup distance) until there is a need to backup the pipeline, as will appear.

The P-read pointer 106 is input to the log 44 as a write address (WA) 106a and is input to the freelist 46 as a read address (RA) 106a. As indicated above, the logical destination operand 102, i.e., the number of a logical register being overwritten in a current cycle, as, for example, pursuant to the add instruction, is input as write data (WD) 102a to the log 44. When a signal designated IM is applied to a write enable (WE) of the log 44 by a state machine 120, as will be described in more detail below, the logical destination operand 102 is written into the log 44 at the location within the log pointed to by the P-read pointer 106 to update the log 44 to reflect which logical register was overwritten in the current cycle.

At the same time, the B-read pointer 107 is input to the log 44 as read address (RA) 107a and is input to an input of a multiplexer 108 as a potential input to the freelist 46. In response to input of the read address (RA) 107a, the log 44 outputs the number of the logical register overwritten at the back-up point, in our example 20 cycles earlier, as read data (RD) 107b. The read data (RD) 107b is input to the back-up map 40 as a write address (WA) 107b, to update the back-up map 40, as will appear.

The freelist 46 is a register file that holds the list of register file 22 locations that are available to be used as new physical homes. If there are 32 logical registers, an embodiment of the invention uses a 64×6 register file as the freelist 46. This means that there are 32 more physical homes in the freelist 46 than the number of logical registers. Thirty-two more registers is arbitrary; more or less registers can be provided. The extra file locations allow each physical home to "age" (i.e. not be used again in a write operation) for a number of cycles equal to the number of physical home numbers minus the number of logical registers. In other words, the extra physical homes are available, one per cycle, in each cycle for a total number of cycles equal to the number of extra physical homes before a physical home must be overwritten.

There are four pointers that address the freelist 46. These are the P-read 106, P-write 109, B-read 107 and B-write 110 pointers. The P-read 106 and p-Write 109 pointers are separated by 32 locations in our example. Similarly, the B-read 107 and B-write 110 pointers are separated by 32 locations. In general, the P-read and P-write pointers (and the B-read and B-write pointers) are separated by a number of locations equal to the number of physical homes minus the number of logical registers. The P-read and B-read pointers (and the P-write and B-write pointers) are separated by a backup time worth of locations, for example, 20 locations. If the P-write pointer is a number that is a power of two away from the P-read pointer, either one of the pointers can be used to generate the other pointer by changing the power of 2 bit of the other pointer. The same is true when the B-write pointer is a power of two away from the B-read pointer.

Note that of these four pointers, the P-read pointer 106 and B read pointer 107 used to index the freelist 46 are identical to the pointers used with the log 44, except that the highest order bit is not used to index the log 44 since the log is a 32×5 register and the freelist 46 is a 64×6 register.

The P-write pointer 109 is input as a write address (WA) 109a to the freelist 46. As indicated above, the output 102d of the multiplexer 105 is input as write data (WD) 102d to the freelist 46. The IM signal is applied to a write enable (WE) of the freelist 46. When the IM signal is asserted, the physical home number comprising the output 102d of the multiplexer 105 is written into the freelist 46 at the location therein indexed by the P-write pointer write address (WA) 109a. At the same time, the P-read pointer 106 input as P-read read address (RA)

106a accesses from the freelist 46 the number of the physical home destination operand 106b indexed by P-read read address (RA) 106a for use to store, in the physical home, the sum of the first and second operands pursuant to the add instruction. Since the P-read and P-write pointers are separated by 32 location with the P-write pointer 109 being a number of locations, e.g. 32, ahead of the P-read pointer 106, the physical home operand 106b output by the freelist 46, in response to the P-read read address (RA) 106a, represents a physical home that has not been used for 32 cycles. Thirty-two cycles is a number of cycles prior to the 20 cycle delay that occurs before a trap condition relating to a particular instruction is recognized by the pipeline. Accordingly, a physical home that has not been written to for 32 cycles does not contain data that must be backup up to since more than 20 cycles have elapsed since the physical home was last written. The output 106b is thus transmitted to the register file 22 as the mapped instruction physical home for the sum of the add instruction.

The physical home destination operand number 106b is also input as write data (WD) to the predicted map 42. The logical destination operand number 102 is input as a write address (WA) 102a' after a one cycle delay via a latch 122 to the predicted map so that when an IM_D signal is output by the a silo 123 and applied to a write enable (WE) of the predicted map 42, the physical-home destination operand number 106b', also delayed by one cycle via a latch 126, is written at the location within the predicted map 42 indexed by the number of the logical destination operand 102. The write operation to update the predicted map 42 is delayed by one cycle because, during each current cycle, the logical destination operand 102 is also used in a read operation as described above. In other words, the data indexed by logical destination operand 102 is first output as read data in the current cycle before the location indexed by logical destination operand 102 in the predicted map 42 is updated using the logical destination operand 102 as a write address. In this manner, the predicted map 42 is updated to reflect the use of physical-home destination operand 106b to store the sum value stored in the logical register referenced by the number of the logical destination operand 102.

Furthermore, the B-read pointer 107a is selected to be the output of the multiplexer 108, unless there is a trap event, and is used as a read address (RA) 108a to index the location within the freelist 46 containing the number of the physical home used to store data 20 cycles earlier, at the backup point. This physical home number is output by the freelist 46 as read data (RD) 108b that is input as write data (WD) to the backup map 40. The read data (RD) 107b indexed by the B-read pointer read address (RA) 107a in the log 44 is input as a write address (WA) to the backup map 40. When an IM_BP signal is output by a silo 124 and applied to a write enable (WE) of the backup map 40, the read data (108b), representing the number of the physical home used at the backup point, is stored at the location within the backup map 40 indexed by the write data 107b, representing the number of the logical register overwritten at the backup point. This operation will update the backup map 40. Each of the backup map 40, predicted map 42 and valid bits register 43 is arranged to provide a write through operation whenever the write address input (WA) 107b, 102a', 102a', respectively, equals a respective read address (RA) input 100a, 101a, 102a, so that the write data (WD) 108b, 106b', 150, as the case may be, is output as the read data 100b, 101b, 102b; 100c, 101c, 102c; 103a, 104a, 105a, as the case may be rather than the read data fetched by the particular read address 100a, 101a, 102a that is equal to the write address 107b, 102a', 102a'.

To effect proper update operation of the register map 18, the pointers are incremented each cycle until a trap event occurs through the use of multiplexers and plus one adders. Upon the occurrence of a trap event, the trap logic 32 controls the select lines of the multiplexers to effect a backup of the pipeline to the backup point, as will now be described.

To that end, the B-read pointer 107a is input to a respective input of a multiplexer 111 and to an input of a plus 1 adder 113. An output of the plus 1 adder 113 is input to another input of the multiplexer 111. The output of the multiplexer 111 provides the B-read pointer 107 that is used in a current cycle.

Likewise, the P-read pointer 106a is input to a respective input of a multiplexer 112 and to an input of a plus 1 adder 114. An output of the plus 1 adder 114 is input to another input of the multiplexer 112. In addition, the B-read pointer 107a is also input to a third input of the multiplexer 112. The output of the multiplexer 111 provides the P-read pointer 106 that is used in a current cycle of pipeline operation.

Similarly, the P-write pointer 109 is input to a respective input of a multiplexer 116 and to an input of a plus 1 adder 118. The output of the plus 1 adder 118 is input to another input of the multiplexer 116. The output of the multiplexer 116 provides the P-write pointer 109 that is used in a current cycle.

The B-write pointer 110 is input to a respective input of a multiplexer 115 and to an input of a plus 1 adder 117. An output of the p'us 1 adder 117 is input to another input of the multiplexer 115. The B-write pointer 110 is also input to a third input of the multiplexer 116. The output of the multiplexer 115 provides the B-write pointer 110 that is used in a current cycle.

Accordingly, until a trap event occurs, for each cycle, the output of each plus 1 adder 113, 114, 117, 118 is selected as the B-read, P-read, B-write and P-write pointers, respectively. In the event of a trap, the valid bits register 43 is flash cleared by a signal 119 asserted by trap logic 32. Thus, all of the valid bits will be cleared, and the outputs 103a, 104a, 105a of the valid bits register 43 will select the 100b, 101b, 102b output signals of the backup map 42 for output by the multiplexers 103-105, respectively. This will immediately provide the physical home number of each logical register as of the backup point in pipeline operation.

At the time of a trap event, the value of P-read pointer 106 is set to the value of the B-read pointer 107 by selecting the B-read pointer input of the multiplexer 112. Also, the value of the P-write pointer 109 is set to the value of the B-write pointer 110 by selecting the B-write pointer input to the multiplexer 116. Moreover, the trap logic 32 selects the B-write input 110 of multiplexer 108 to utilize the B-write pointer 110 as the read address 108a to freelist 46 at a cycle when a trap event is recognized. This will backup the log 44 and freelist 46 and cause continued updates to the backup map 40 and predicted map 42 to proceed from the backup point.

As the execution of instructions continues from the backup point along the "correct" path, only the P-read and P-write pointers 106, 109 are incremented in each cycle by again selecting the output of the plus 1 adder 114, 118, respectively for output by the multiplexers 112, 116, respectively. When the P-read pointer 106 is a backup distance away from the B-read pointer 107, the B-read pointer 107 is again incremented each cycle by selecting the plus 1 adder output 113 as the B-read pointer 107. Similarly, when the P-write pointer 109 is a backup distance away from the B-write pointer 110, the B-write pointer 110 is again incremented each cycle through the selection of the plus 1 adder 117 as the B-write pointer 110.

Select line control of the multiplexers 111, 112, 115, 116 will now be described. Only instructions that write to a logical register are mapped. Thus, a state machine 120 can be provided with the type of instruction from the opcode of the instruction to determine if a write operation is to occur, i.e. whether the number of a logical register is to be written is at the specified logical destination operand 102. If a write operation is to occur, the state machine 120 enters a state to output a logical 1 signal when a logical register is specified. The logical 1 signal selects the output of the plus 1 adders 114, 118 for output by the multiplexers 112, 116, respectively to increment P-read and P-write. The state machine 120 also inputs the logical 1 into a silo 121. The silo 121 is a backup time in length, in our example 20 cycles. Thus, the output of the silo 121 controls the select lines of multiplexers 111, 115 to select the outputs of the plus 1 adder 113, 117 for output by the multiplexers 111, 115 to increment the B-read and B-write pointers, respectively, twenty cycles later so that the B-read and B-write pointers increment at the backup distance.

In the event that an instruction to be executed does not include a write operation to a logical register, the state machine 120 enters a state to output a logical zero. The logical zero selects the P-read 106 and P-write 109 inputs of the multiplexers 112, 116, respectively to output the same P-read 106 and P-write 109 number as in the previous cycle. The state machine 120 also inputs the logical zero into the silo 121 to effect B-read pointer and B-write pointer operation accordingly, through selection of the B-read and B-write inputs to the multiplexers 111, 115, respectively, twenty cycles later.

Thus, the state machine 120 inputs a logical 1 or zero each cycle into the silo 121 for control of the B-read and B-write pointers that mirrors control of the P-read and P-write pointers, but delayed 20 cycles. The silo 121 is cleared by the trap logic 32 when a trap event occurs such that zeros are output by the silo 121 for twenty cycles after a trap event to prevent incrementing of the B-read and B-write pointers until the P-read and P-write pointers have incremented twenty cycles from the backup point.

The state machine 120 is also arranged to output the IM signal discussed above in each cycle that the state machine 120 outputs a logical 1, so that the write enable of each of the log 44 and freelist 46 causes the logical destination operand write data 102a and the physical home write data 102d provided by the multiplexer 105 to be written to the log 44 location and the freelist 46 location, respectively, specified by the P-read write address 106a and P-write write address 109a, respectively. During cycles that the state machine 120 outputs a logical zero and the P-read and P-write pointers are not incremented, the IM signal is not asserted.

The IM signal output by the state machine 120 is also input to each of the two silos 123, 124. The silo 123 is one cycle long, so that the output of the silo 123 comprises the IM_D signal input to the write enable of the predicted map 42 one cycle after assertion of the IM signal to enable the writing of the write data 106b'into the predicted map. The silo 124 is 20 cycles long so that the output of the silo 124 comprises the IM_BP signal input to the write enable port of the backup map 40 a back up time, i.e. 20 cycles in our example, after assertion of the corresponding IM signal. The silo 124 would be cleared upon a trap event by the trap logic 32. The output to the silo 121 can be used as the IM_BP signal in lieu of a second silo 124.

In addition, the IM_D signal is applied to a write enable (WE) of the valid bits register 43 and the write address 102a' is applied to a write address input of the valid bits register 43. A register 150, containing a logical 1, is coupled to a write data input of the valid bits register 43. In this manner, the valid bit specified by the write address (WA) 102a' will be set valid after each write operation to update the predicted map 42.

A second scheme for controlling the multiplexers 111, 112, 115, 116 assumes a pipeline where all cycles sent to the E-BOX 13 use up a register from the freelist, even the NOP instructions. The register map 18 is then used every cycle. In this mode of operation, the E-BOX 13 would use a logical register (for example R31) that, when written, throws away the result. This register is the one written (mapped again and again) during the generation of NOP instructions.

A third scheme for controlling the multiplexers 111, 112, 115, 116 only maps instructions that are issued. No mapping is done for NOP instructions that are issued. This scheme also requires a silo that is a backup-time in length. The silo is loaded when P-read is processed. If the register map 18 is processing an instruction that issues, then P-read is incremented to P-read+1 and a 1 is written into the silo. Otherwise, a zero is written into the silo.

The B-read processing is controlled by the output of the silo 121, as in the first described embodiment, and will select the same B-read value when a zero comes out of the silo, and selects the B-read+1 value when a logical 1 comes out. The silo is cleared when the machine backs up due to a trap event.

An example of the operation of the register map 18 now follows. Assume an instruction is sent to the register map 18 from the I-Buffer 14, this instruction being "add R1, R2→R7". This instruction will cause the E-BOX 13 to add the contents of logical registers R1 and R2 and place the resulting value into logical register R7. When the instruction arrives at the register map 18, the physical homes for all three of the logical registers R1, R2 and R7 are looked up in both the backup map 40 and the predicted map 42 as described above. The state of the valid bit 43 in the predicted map 42 is checked for each of the registers that are being looked up. If the valid bit is set in valid bits register 43, then the correct physical home will be chosen from the predicted map 42 through control of the appropriate multiplexers 103, 104, 105. The correct physical home will be indicated by the backup map 40 for each of the logical registers whose valid bits are not set.

The values in the logical registers that are being read for the instruction (in this instance R1 and R2) are found at the physical homes in register file 22 that were identified using the backup map 40 or the predicted map 42. The mapping for the logical registers that are read remain the same. However, the logical register that is being written to (in this instance R7) must be mapped to a new physical home so that the old value in the logical register will not be overwritten for a period of time at least equal to the backup time.

In order to map the logical register that is being written to, the following operations occur. The logical register number 102 is stored in the log 44 at the location pointed to by P-read 106. Note that this logical register is logically being overwritten. The present physical home of the logical register R7 102b or 102c (obtained from the backup map 40 or the predicted map 42) is stored into the freelist 46 at the location pointed to by P-write 109. This starts the aging process. Note that this physical home will now be reused after a number of cycles equal to the number of physical homes minus the number of logical registers, at which time this entry will be pointed to by P read 106 in the freelist 46.

The new physical home of the logical register R7 is taken from the freelist 46 at the location pointed to by P-read 106, which is 32 location behind P-write 109. This new physical home for logical register R7 is then stored into the predicted map 42 at the appropriate location 102a indexed by logical register number R7.

The corresponding valid bit in the valid bit register 43 is set. As described above, the device 150 is provided to constantly output a logical one value as write data to the valid bits register 43. The logical destination operand read address (RA) 102a is also input to the valid bits register 43 as a write address (WA) to thereby set the valid bit for the predicted map location indexed by each read address 102a in each cycle.

In every cycle, the physical home that is being changed 102d for the logical register that is being overwritten is placed back in the freelist 46 to age for 32 cycles. Further, this physical home is replaced for that logical register in the predicted map 42 by the new physical home 106b, chosen from the freelist 46 as write data (WD) 106b. The new physical home 106b has already aged 32 cycles.

At the same time, the logical register used to store the data is being mapped, the backup map 40 must be updated by one cycle's worth of change to a new backup state. This is accomplished by the following operations. The logical register that was written a backup time ago is identified by addressing the log 44 with the value of B-read 107. One backup time before the present cycle, this logical register that was written to was given a new physical home. This new physical home is read from the freelist 46, by indexing the freelist 46 with B-read 108a. The new physical home 108a that was assigned to the logical register a backup time ago, and now read from the freelist 46, is written into the backup map 40 at the location indexed by read data 107b, corresponding to the logical register number overwritten twenty cycles earlier.

In summary, the logical register that was changed one backup time ago is found in the log 44, the new physical home that was assigned one backup time ago for that logical register is found in the freelist 46, and this new physical home that was assigned to the logical register at the backup time is supplied by the backup map 40 at the correct logical register number. In this way, the backup map 40 will reflect the change in the physical home for the logical register that was written to one backup time ago.

Note by careful observation of the sequence of actions described that the advancing of the state of either the backup map, along with the B read pointer and the B write pointer, or the predicted map, together with the P read pointer and the P write pointer, is reversible.

They can be run backwards. When reverse operation is desired, the pointer must be decremented in an analogous manner as the plus one adders 113, 114, 117, 118 used in normal ongoing operation.

By the above procedures, the logical register that is being written to is given a new physical home in the register file 22 so as not to overwrite the value in the old physical home assigned to that logical register for a period of time at least as long as the backup time. The change in the physical home for that logical register is stored in the predicted map 42, and this change is listed in the log 44. At the same time, the backup map 40 is modified to reflect the change in the physical home for a logical register that was made one backup time ago, in order for the backup map 40 to accurately reflect the physical home of each of the logical registers at the backup point. The physical homes for each of the two registers that are being read to perform the instruction are provided by either the backup map 40 or the predicted map 42, using the valid bits to decide which of the two maps 40, 42 contains the correct physical home numbers for the logical registers.

After this sequence of operations is performed, the four pointers, P-read, B-read, P-write and B-write are all incremented through the use of the plus 1 adders 113, 114, 117, 118, as previously described.

Upon the recognition of a trap or other event requiring a backup, all of the valid bits in the valid bit register 43 are flash cleared. This "flash-clearing" causes the backup map 40 to contain the only correct physical home numbers for the logical registers. Thus, when a logical register is read in the performance of an instruction, the physical home for the logical register will be chosen from the backup map 40.

If there is only one backup time, the flash-clearing of the valid bits in the valid bits register 4 will immediately back up the system to the exact backup point. However, in many computer designs, there is more than one backup time. There is therefore a need to be able to back up the register map 18 to the other backup points. This is performed by backing up the register map 18 for a single cycle or more worth of activity. As indicated above, the updating is reversible.

To back up the backup map, together with the P read pointer and the B write pointer, for a single cycle, the following steps are performed. The last logical register whose physical home was updated in the backup map 40 is read from the log 44 using the B-read pointer. It is the new physical home that was stored in the location for a logical register in the backup map 40 that must be corrected. The present physical home of this last logical register that was updated is read from the backup map 40 once it is determined from the log 44 which was the last logical register that was updated. The old physical home of the last register updated is read from the freelist 46 using the B-write pointer.

This old physical home replaces the new physical home for the corresponding logical register in the backup map 40. At this time, the state of the backup map 40 has been restored (i.e. backed up) by one cycles' worth of activity.

The above-described embodiment provides for one backup time that can be reached quickly, i.e. in one cycle, by "flash-clearing" the valid-bits and setting P-read equal to B-read and P-write equal to B-write. To reach another backup point the register map 18 can be backed up one cycle worth of activity at a time.

The register map of the present invention can be generalized to reach more than one backup time quickly, by adding additional intermediate backup maps, associated valid-bits, and corresponding read and write pointers.

The above-described embodiment has a predicted map 42 and its associated valid-bits 43 as well as a backup map 40. In addition, there are P-read, P-write, B-read and B-write pointers. To add an intermediate backup point requires the addition of an intermediate or IBackup-map, an associated IBackup valid-bits structure as well as IB-read and IB-write pointers. Similarly, more intermediate backup points can be added with additional maps and pointers. Choosing a present physical home of a logical register requires looking the register up in the backup-map, the IBackup-map and the predicted-map.

If the valid-bit associated with the entry of the predicted-map is on, then the predicted-map specifies the present physical home of the logical register. If the valid-bit associated with the entry in the predicted-map is off, but the valid-bit in the IBackup valid-bits structure is on, then the IBackup-map specifies the present home of the logical register. If neither of the valid-bits are on, then the Backup-map specifies the present home of the logical register.

Backing up the pipeline to the intermediate backup point simply requires "flash-clearing" the valid-bits associated with the predicted-map and setting P-read equal to IB-read, and P-write equal to IB-write. As processing continues from the intermediate backup-point, the P-read and P-write pointers will advance for each cycle processed and move forward until they are an intermediate backup-distance away from the IB-read and IB-write pointers. Then the IB-read and IB-write pointers will start incrementing. Similarly, since the intermediate backup moves the P-read and P-write pointers backwards less than the backup-distance from B-read and B-write, B-read and B-write will stop advancing until P-read and P-write have advanced the full backup-distance from B-read and B-write.

To backup the pipeline to the backup point requires "flash-clearing" the valid-bits associated with both the predicted-map and the IBackup map. As processing continues from the backup point, the P-read and P-write pointers will increment for each cycle processed and move forward until they are intermediate backup-distance away from the IB-read and IB-write pointers. Then the IB-read and IB-write pointers will begin incrementing. Processing continues and when the P-read and P-write pointers have advanced the full backup distance from B-read and B-write, then the B-read and B-write pointers will begin incrementing.

When the P-read pointer is a full intermediate distance from IB-read and processing is continuing, the IBackup map must be updated to remain a description of the physical homes an intermediate distance behind the present point. This update requires reading the logical register that was written an intermediate backup distance in time ago, by reading the Log using the pointer IB-read as the index. The physical home that was assigned to that logical register is obtained by reading the Freelist using the pointer IB-read as the index. The IBackup-map is written using the logical register number read from the Log as the address and the physical home read from the Freelist as the data. In addition, the valid-bit in IBackup valid-bits addressed by the logical register number read from the Log is set on.

Adding more backup points to the register-mapper has no effect on the operations used to map the logical register that is being written to.

There are two kinds of backing up that are done. One kind has already been described, in which the predicted-path was incorrect. In other words, a wrong sequence of instructions was followed. In this circumstance, the flash clearing of the valid bit register 43 and the use of the backup map 40 allow the correct sequence of instructions to be executed, using the correct values of the logical registers, beginning at the backup point.

The other kind of backing up that is done is when the correct sequence of instructions is followed, but incorrect data was used as, e.g. when a data cache read miss has occurred. In such a circumstance, after the correct data is loaded into the D-cache 26 for example, the mapped instructions are simply replayed from the replay buffer 20, beginning at the backup point. The silo 121 is frozen during a replay of instructions.

The present invention provides a method and apparatus for register mapping for a pipelined computer which specifies the exact physical home of a logical register, while remaining inexpensive in terms of the number of logic gates needed to implement the register map. The physical homes for the logical registers in any of the cycles prior to the present cycle up to a maximum backup point can be provided with the present invention, which also provides a flash-clearing function to back up in one cycle to a specified backup point.

What is claimed is:

1. An arrangement for mapping m logical registers used in the execution of instructions processed through a computer pipeline, comprising:
   a register file having n locations for storing values, said locations being physical homes of the m logical registers, where $m < n$; and
   a register map coupled to the register file and receiving instructions as input and generating mapped instructions as output to the register file, the register map comprising:
   a free list that contains a number of locations p, each said free list location containing a register file location, the free list indicating which of said register file locations are free for use in a current cycle;
   a log that contains a sequential listing of which of the m logical registers were changed in each of t cycles preceding a current cycle;
   a backup map that contains a map associating m of the n physical homes to the m logical registers at a backup point, wherein the backup point is a preselected number of cycles preceding the current cycle and wherein the preselected number of cycles is equal to, or less than, t;
   a predicted map that contains a map associating m of the n physical homes to the m logical registers during the current cycle; and
   a register map control device coupled to each of the free list, log, backup map, and predicted map, the register map control device receiving the instructions input to the register map, maintaining the free list, log, backup map and predicted map, the backup map being maintained using the sequential listing of the log, the register map control device generating the mapped instructions output by the register map.

2. The arrangement of claim 1, wherein the register map further comprises a valid bits register coupled to the register map control device, the valid bits register including a set of valid bits, each one of the valid bits corresponding to one of the m logical registers for indicating whether the physical home, associated with the corresponding logical register, is to be taken from the backup map or the predicted map when mapping registers.

3. A method of maintaining a mapping of m logical registers to n physical homes contained in a register file, wherein m < n, for instructions processed in a computer pipeline, comprising the steps of:

receiving an instruction, during a current cycle, the instruction specifying at least one address of one of the m logical registers to be mapped in a register map;

maintaining a free list that indicates which of the n physical homes in the register file are free for use in the current cycle;

mapping the at least one address of the received instruction into at least one of the free physical homes indicated in the free list and associating the one of the free physical homes with the corresponding one of the m logical registers;

maintaining in a log a sequential listing of which of the m logical registers were changed in each of t cycles preceding the current cycle;

utilizing the log to maintain in a backup map the physical home associated with each one of the m logical registers at a backup point, wherein the backup point is a preselected number of cycles preceding the current cycle and wherein the preselected number of cycles is equal to, or less than, t;

maintaining in a predicted map a map of the physical home associated with each one of the m logical registers during the current cycle;

maintaining a set of valid bits that indicate whether the physical home associated with a specific logical register is to be taken from the backup map or the predicted map when mapping registers.

4. The method of claim 3, further comprising the step of flash-clearing the set of valid bits in response to a control signal, to thereby indicate that a correct physical home for a logical register is to be taken from the backup map when backing up an instruction stream.

5. The method of claim 3, wherein the step of maintaining a freelist includes storing a present physical home for a logical register being changed, in a first location in the freelist, and assigning a new physical home to the logical register being changed from a second location in the freelist.

6. The method of claim 5, wherein the step of maintaining a freelist further includes aging of the present physical home that is stored by storing the present physical home for a period of time at least equal to a backup time before assigning the aged physical home as a new physical home to a logical register being changed, wherein the backup time is equal to the number of cycles occurring from the backup point to the current cycle.

7. The method of claim 6, wherein the step of maintaining in a predicted map includes storing the new physical home for the logical register being changed, into the predicted map at a location indexed by the logical register being changed.

8. The method of claim 7, wherein the step of maintaining a set of valid bits includes setting a valid bit that corresponds to the logical register being changed.

9. The method of claim 8, wherein the step of maintaining in a backup map includes addressing the log to identify a logical register that was changed a backup time ago, identifying from the freelist a physical home that was assigned to the logical register that was changed a backup time ago, and storing this physical home into the backup map at a location indexed by the logical register that was changed a backup time ago.

10. A method of assigning physical homes to logical registers used in executing instructions processed through a computer pipeline, comprising the steps of:

receiving in a register mapping station a new instruction to be executed during a current cycle;

identifying the logical register that is being written to in the current cycle;

identifying the logical registers that are being read in the current cycle;

maintaining a log that contains a sequential listing of which of the m logical registers were changed in each of t cycles preceding the current cycle, the step of maintaining the log including the step of updating the log to include the register written to during the current cycle;

maintaining a backup map by using the sequential listing of the log, the backup map comprising a map of physical homes associated with the logical registers at a backup point, wherein the backup point is a preselected number of cycles preceding the current cycle and wherein the preselected number of cycles is equal to, or less than, t;

maintaining in a predicted map, a map of the physical home associated with each one of the m logical registers during the current cycle;

maintaining a set of valid bits, one valid bit being associated with each of the logical registers;

determining the state of valid bits associated with each of the logical registers that are being read in the current cycle;

providing a physical home for each logical register that is being read in the current cycle from the backup map if the state of the valid bit associated with that logical register is in a first state, and from the predicted map if the state of the valid bit associated with that logical register is in a second state; and assigning from a freelist a new physical home to the logical register that is being written to in the current cycle;

wherein the number of physical homes is greater that the number of logical registers.

* * * * *